Figure 1:
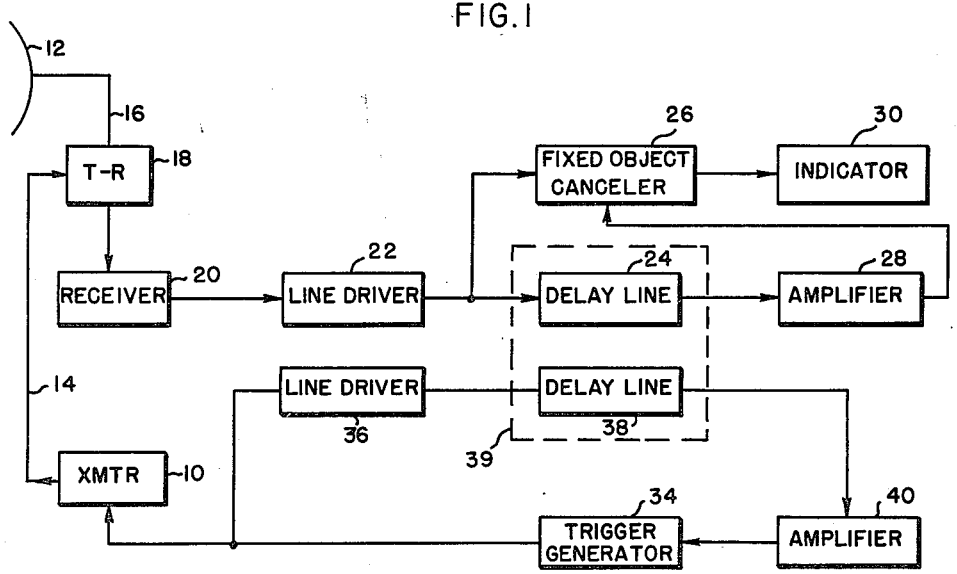

Nov. 10, 1953 A. E. BENFIELD 2,659,080
SELF-SYNCHRONOUS MOVING TARGET INDICATION SYSTEM
Filed Jan. 7, 1946

INVENTOR.
ADALBERT E. BENFIELD
BY
ATTORNEY

Patented Nov. 10, 1953

2,659,080

UNITED STATES PATENT OFFICE 2,659,080

SELF-SYNCHRONOUS MOVING TARGET INDICATION SYSTEM

Adalbert E. Benfield, Sudbury, Mass., assignor, by mesne assignments, to the United States of America as represented by the Secretary of War Application January 7, 1946, Serial No. 639,647

3 Claims. (Cl. 343—7.7)

1

The present invention relates generally to radio object locating systems and more particularly to delay type transmission lines employed in such systems.

A radio object locating system, in general, includes a transmitter adapted to radiate short duration high carrier frequency exploratory pulses of radiant energy and a receiver responsive to object returned echo pulses. These echo pulses are amplified and presented as video pulses on a cathode ray tube indicator. As echo pulses are returned from both fixed and moving objects certain particular objects are "lost in" or obscured by echoes from stationary objects and ground clutter (reflection from small irregularities on the ground). Various systems have been developed to obviate this difficulty, and one such system is more fully described in the copending application of Robert H. Dicke, Serial No. 590,052, filed April 24, 1945, issued August 31, 1950, as Patent No. 2,535,274.

In the system described in the above-mentioned application fixed objects are manifested by video pulses having a constant amplitude, whereas moving objects are manifested by video pulses having a cyclical variation in amplitude.

The distinctive characteristics of moving object echoes and fixed object echoes may be utilized to provide an indication of moving objects only. In the instance of fixed objects represented by constant amplitude video pulses there is no difference in amplitude between successive pulses, however, there is a difference in amplitude between successive video pulses representing moving objects. Thus by comparing any two successive video pulses with a view towards determining the difference in amplitude between them, a residual pulse is obtained for moving objects but not for fixed objects.

The comparison of pulses is achieved in a fixed object canceler which consists of a network adapted to obtain a residual signal proportional to the difference in amplitude between two pulses simultaneously applied thereto. By applying this residual signal to a suitable indicator such as a cathode ray tube, it is evident that moving objects only will be shown thereon. In order to compare any two successive pulses it is necessary to store or delay the first video pulse for a period of time equal to the time interval between the two pulses. This interval is equal to the predetermined interval between successive exploratory pulses.

It is an object of the present invention therefore to provide a novel system for delaying video pulses by the proper amount.

A second object of this invention is to illustrate a method of spacing in time the successive exploratory pulses transmitted by the radio object locating system.

A still further object of this invention is to

2 provide a means of maintaining a stable relationship between the spacing in time of the transmitted exploratory pulses and the time delay of the video signals.

Figure 2:
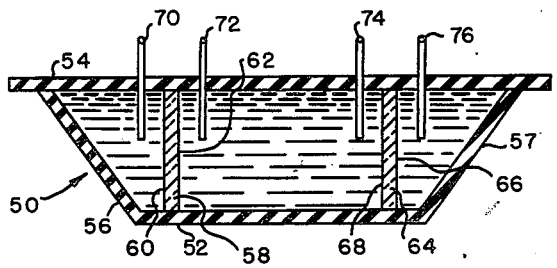

For a better understanding of the invention together with other and further objects thereof, reference is had to the following description taken in connection with the accompanying drawing in which:

Fig. 1 is a block diagram of a radio object locating system capable of distinguishing between fixed and moving objects; and, Fig. 2 is a detailed view of one of the delay type transmission lines employed in the system shown in Fig. 1.

Referring now to Fig. 1 of the drawings wherein system transmitter 10 is a source of exploratory pulses which is connected to the system antenna 12 by transmission lines 14 and 16 and the transmit-receive device 18 connecting the above-mentioned transmission lines 14 and 16. Transmit-receive device 18 hereinafter referred to as T-R device 18 connects the system transmitter 10 to the antenna 12 during the time that the exploratory pulses are transmitted and connects antenna 12 to the system receiver 20 during the time that echo pulses are being received. Video signals resulting from object returned echo signals that appear in the output of receiver 20 are connected to a line driver circuit 22. Receiver 20 provides means for comparing the phase of the returned echo signals with the phase of a reference signal so that the video signals in the output of receiver 20 resulting from echoes from fixed objects will have a constant amplitude while signals resulting from echoes from moving objects will have a cyclical variation in amplitude. Line driver circuit 22 may be any of a number of circuits that will convert a video signal which will normally suffer considerable distortion in passing through delay type transmission line 24 to a corresponding signal that will be passed with less distortion. In one of its simpler forms line driver 22 is a pulsed oscillator operating at a frequency of 10 to 30 megacycles per second and producing one oscillatory wave train having an envelope substantially similar to the waveshape of the video signals applied to the input thereof each time one of said video signals occurs. The output of line driver 22 is applied to delay type transmission line 24 hereinafter referred to as delay line 24 and to fixed object canceler circuit 26 hereinafter referred to as canceler circuit 26. The output of delay line 24 is applied through an amplifier 28 to a second input to canceler circuit 26. The output of canceler circuit 26 is applied to an indicator 30.

System transmitter 10 produces a pulse of energy only upon the application of a control pulse supplied by a trigger generator 34. Trigger generator 34 in turn will produce a control pulse only upon the application of a synchronizing signal at the input thereof. In order to obtain a stable interval between exploratory pulses a portion of the output of trigger generator 34 is applied to the input of a second line driver circuit 36. Line driver 36 may be exactly like line driver 22 or it may be any one of many similar circuits. The output of line driver 36 is applied through a second delay line 38 to an amplifier 40 and thence to the input of trigger generator 34. Delay lines 24 and 38 are located in close proximity and are both inclosed in a housing represented by dashed line 39.

Referring now to Fig. 2 of the drawing wherein there is shown in section a type of delay line that may be advantageously employed as the delay lines 24 and 38 in the circuit shown in Fig. 1. The delay line shown includes a tank 50 having a bottom 52, a cover 54, and two end walls 56 and 57, respectively, inclined to the bottom 52. The tank (or container) 50 may be of any suitable insulating material for example glass or "Bakelite." A transmitting piezoelectric crystal 58 having faces 60 and 62 thereof substantially perpendicular to bottom 58 is disposed a predetermined distance from the end wall 56 of the tank 50. Crystal 58 is so joined to the sides and bottom 52 of tank 50 that it forms a partition therein.

At a predetermined distance from the other end wall 57 a second piezoelectric crystal 64 is mounted so as to form a second partition. Faces 66 and 68 of crystal 64 are perpendicular to bottom 52 of tank 50. A transmitting medium is introduced into tank 50 to a depth sufficient to cover both faces of crystals 58 and 64. A specific transmitting medium is not required however mercury forms an excellent medium since its acoustic impedance will be substantially equal to the acoustic impedance of crystals 58 and 64. Since mercury is also a conductor of electricity, electrical connections to the faces 60 and 62 of crystal 58 may be made by inserting probes 70 and 72 into the mercury. Insulation is provided between the two probes by crystal 58. In a similar manner connections are made to the faces 66 and 68 of crystal 64 by inserting probes 74 and 76, respectively, in the mercury confined on either side of crystal 64. It should be understood that any other conductive liquid may be used in place of mercury or that any nonconducting liquid may be employed and electrical connections made to the faces of the crystals by soldering or otherwise attaching suitable leads thereto.

To delay a signal with a line of this type the signal is impressed across terminals 70 and 72 causing crystal 58 to oscillate in accordance with the well known piezoelectric phenomenon. The oscillation of the crystal sets up an ultrasonic vibration in the liquid medium (preferably of a frequency between 10 and 30 megacycles) which is propagated toward crystal 64 at a calculable finite velocity. The ultrasonic vibration impinging on crystal 64 causes stresses therein thereby causing an alternating voltage to appear between probes 74 and 76. The signal appearing between probes 74 and 76 will be substantially the same as the signal applied between terminals 70 and 72 but will occur later in time by an amount proportional to the spacing between crystals 58 and 64. In some applications the spacing between crystals 58 and 64 may be made adjustable to provide an adjustable delay in the signal while in other applications it will be satisfactory to calculate the correct spacing and make the line nonadjustable.

Signals will also be propagated from the crystals toward end walls 56 and 57. These signals are undesirable and, therefore, end walls 56 and 57 are so placed that these undesired signals are multiply reflected so that their effect on the crystals is negligible.

For a more detailed description of the construction and operation of liquid delay lines reference is made to the copending application of G. Donald Forbes and Herbert Shapiro, Serial No. 608,310, filed August 1, 1945, issued July 1, 1947 as Patent No. 2,423,306.

Referring again to the circuit shown in Fig. 1, let it be assumed that a trigger is applied to system transmitter 10 by trigger generator 34. An exploratory pulse is generated by transmitter 10 and is radiated by antenna 12. This exploratory pulse impinges on any fixed and moving objects lying within the beam of antenna 12 and is partially reflected or reradiated thereby. A portion of this reflected energy is received by antenna 12, amplified by receiver 20 and applied as video modulating signals to line driver 22. Pulsed continuous wave signals are applied simultaneously to fixed object canceler 26 and delay line 24. After an interval of time the signals originally applied to delay line 24 are applied to amplifier 28 and thence to fixed object canceler 26. Signals arriving at fixed object canceler 26 from amplifier 28 are in 180 degree phase opposition to signals arriving from line driver 22.

While this action is progressing the pulse initially applied to transmitter 10 is applied to line driver 36 which in turn impresses a signal on the input of delay line 38. After a delay period caused by line 38 a signal is applied to amplifier 40 which when amplified therein causes trigger generator 34 to supply a second trigger to transmitter 10. A second exploratory pulse is transmitted which will be reflected by the same objects that reflected the first exploratory pulse. These reflected pulses will appear at the output of receiver 20 as video pulses. The amplitudes of the video pulses resulting from the reflection of the second exploratory pulse by fixed objects will be substantially the same as the amplitudes of the video pulses resulting from the reflection of the first exploratory pulse from the same objects. The amplitude of the video signals resulting from reflection of successive exploratory pulses from moving objects will vary in a cyclic manner. Reasons for this cyclic variation in amplitude are set forth in detail in the above-mentioned copending application of Dicke.

The delay caused by delay lines 24 and 38 are so chosen that signals from line driver 22 resulting from the second exploratory pulse are applied to fixed object canceler 26 at exactly the same times that corresponding signals from amplifier 28 resulting from the first exploratory pulse are also applied. The two sets of pulses are added taking due note of phase. Signals from fixed objects will result in complete cancellation due to their constant amplitude but signals from moving objects will result in residual signals due to the variation in amplitude of the echoes from moving targets.

It can be seen from the foregoing discussion that it is important that the relative delays caused by lines 24 and 38 be fixed relative to each other although a change in the total delay is in many cases unavoidable. To maintain this delay as constant as possible housing 39 is constructed of an insulating material so as to maintain the temperature of the delay lines as constant as possible. Placing the delay line in close proximity within said enclosing means insures that the temperature differential between any two of said lines will be a minimum. This insures that the relative delays caused by the various delay lines will maintain a fixed relationship relative to each other. It has been found that this arrangement operates satisfactorily thus allowing the simple delay lines herein described to be employed rather than employing one delay line to perform the two functions now individually performed by delay lines 24 and 38, the principal objection to the use of one delay line being that relatively complicated separating systems are necessary to properly direct the signals in the output of the delay lines. Another advantage of the delay system described herein is that a spare delay line may be enclosed in housing 39 that may be used to replace either delay line 24 or 38 should one of these lines be damaged for some reason. It will be obvious that this second advantage is of even greater importance in systems employing a plurality of transmitting antennas. Each delay line employed in the system may be of identical construction and the number of spare delay lines and parts thereof that must be provided to insure continuous operation is a minimum.

While there has been described what is at present considered the preferred embodiment of the invention it will be obvious to those skilled in the art that various changes and modifications may be made therein without departing from the invention.

What is claimed is:

1. A radio system designed to locate the position of moving targets comprising a transmitter for generating exploratory pulses, directional radiating means adapted to radiate said exploratory pulses and receive object returned echoes resulting from reflection of a portion of said exploratory pulses, a receiver adapted to amplify said object returned echoes, means for connecting said radiating means to said transmitter during the time of transmission of said exploratory pulses and to said receiver during the time of reception of said object returned echoes, a first driver means responsive to the output of said receiver means and adapted to provide pulse modulated continuous wave signals in response to signals from said receiver, a first delay type transmission line, a fixed object canceler having first and second input terminals whereby two inputs may be compared therein, means for connecting the output of said first driver to the input of said delay type transmission line and to said first input terminal of said fixed object canceler, a first amplifier means having an input connected to the output of said first delay type transmission line and an output connected to said second input terminal of said fixed object canceler, an indicator circuit, said fixed object canceler being adapted to compare the signals applied at said first and second input terminals thereof and to transmit to said indicator signals resulting from the reflection of said exploratory pulses from moving targets only, a trigger generator adapted to generate pulses which when applied to said transmitter will cause said transmitter to generate said exploratory pulses, a second driver means adapted to produce pulsed continuous wave oscillations upon receipt of pulses from said trigger generator, a second delay type transmission line with the input thereof connected to the output of said second driver, a second amplifier adapted to amplify signals received from the output of said second delay type transmission line and further adapted to apply said amplified signals to the input of said trigger generator, said trigger generator, said second driver, said second delay line and said second amplifier operating in combination to cause the pulses applied to said transmitter by said trigger generator to be equally spaced in time with said spacing in time being substantially equal to the interval between the application of a signal to said first input of said fixed object canceler and the application of a corresponding signal to said second input of said canceler, and an enclosing means adapted to maintain said first and said second delay type transmission lines at a substantially constant temperature with a minimum temperature differential between said lines.

2. A self-synchronous, pulse-echo, moving target indication system comprising: means for transmitting exploratory pulses of electrical energy; means for receiving echoes of said pulses reflected from targets; indicator means; a first delay type transmission line; first driver means receptive of said echo pulses from said receiving means and providing an input for said first delay line; fixed object cancelling means receptive of said echo pulses from said first driver means and of the output from said first line, for transmitting to said indicator means only echoes received from moving targets; means for triggering said transmitting means; a second delay type transmission line; second driver means providing an input for said second delay line and receptive of the output of said triggering means; said triggering means being coupled to the output of said second delay line and synchronizing the activation of said transmitting means with the output of said second line; and inclosing means adapted to maintain both said delay type transmission lines at a substantially like temperature, both said delay type transmission lines being located in close proximity within said enclosing means whereby the temperature differential between said lines is a minimum.

3. In a pulse-echo, moving target indication system including transmitter means and receiving means, a plurality of delay type transmission lines in close proximity with one another, one of said lines being coupled to said receiving means and being used to delay received target echo pulses taken from said receiving means in order that the delayed echo pulses may be compared with the undelayed echo pulses to provide an indication of fixed and moving targets, means for triggering said transmitter means, means for coupling the output of a second of said lines to said triggering means, means for coupling the output of said triggering means to said second line as an input thereto, and means enclosing said plurality of lines, for maintaining a minimum temperature differential between them.

ADALBERT E. BENFIELD.

References Cited in the file of this patent

UNITED STATES PATENTS

| Number | Name | Date |
|---|---|---|
| 2,212,173 | Wheeler et al. | Aug. 20, 1940 |
| 2,407,294 | Shockley | Sept. 10, 1946 |
| 2,416,337 | Mason | Feb. 25, 1947 |
| 2,421,026 | Hall et al. | May 27, 1947 |
| 2,434,255 | Bond et al. | Jan. 13, 1948 |
| 2,532,546 | Forbes | Dec. 5, 1950 |

FOREIGN PATENTS

| Number | Country | Date |
|---|---|---|
| 552,072 | Great Britain | June 10, 1943 |